H. WEDEMAN.
SPRING WHEEL.
APPLICATION FILED JUNE 5, 1913.
1,104,283.
Patented July 21, 1914.
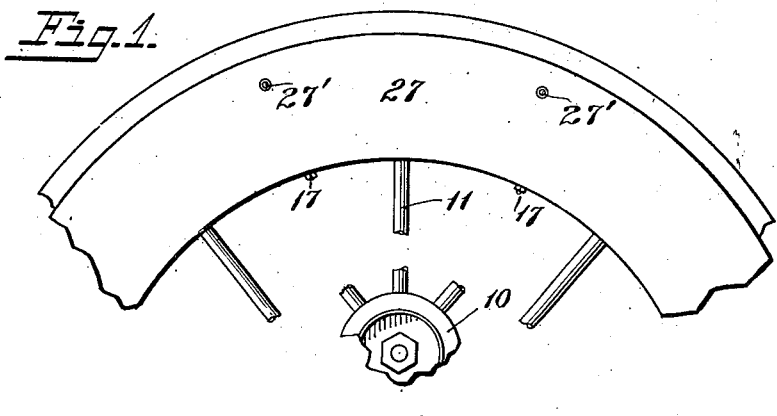
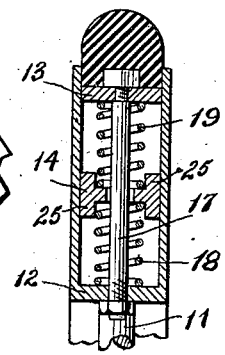
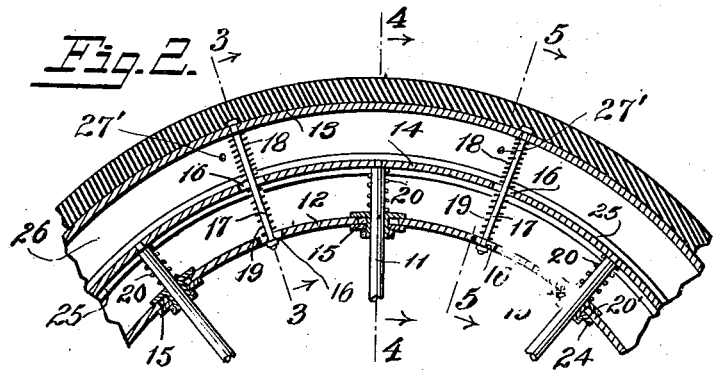
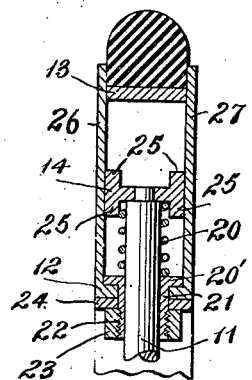
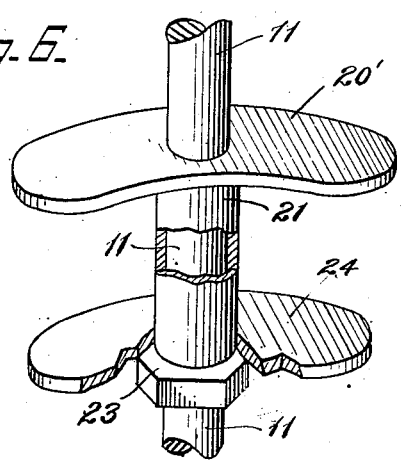
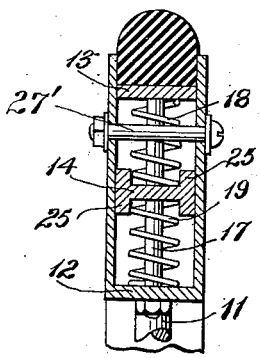
Witnesses
Marshall Low
Henry T. Bright
Inventor
H. Wedeman
By Chandlee Chandlee
Attorneys

UNITED STATES PATENT OFFICE.

HARRY WEDEMAN, OF MANHATTAN, MONTANA.

SPRING-WHEEL.

1,104,283. Specification of Letters Patent. Patented July 21, 1914.

Application filed June 5, 1913. Serial No. 771,966.

*To all whom it may concern:*

Be it known that I, HARRY WEDEMAN, a citizen of the United States, residing at Manhattan, in the county of Gallatin, State of Montana, have invented certain new and useful Improvements in Spring-Wheels; and I do hereby declare the following to be a full, clear, and exact description of the invention, such as will enable others skilled in the art to which it appertains to make and use the same.

This invention relates to spring wheels.

The object of the invention resides in the provision of a spring wheel which shall be sufficiently sensitive in its action to absorb shocks in passing over rough roads.

A further object of the invention resides in the provision of a spring wheel which will enable the use of a pneumatic tire to be dispensed with and thereby obviate the various disadvantages incident to the use of a pneumatic tire.

A still further object of the invention resides in the provision of a spring wheel which will be simple in construction, efficient in use, and which may be manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a fragment of a wheel constructed in accordance with the invention; Fig. 2, a vertical section of a fragment of what is shown in Fig. 1; Fig. 3, a section on the line 3—3 of Fig. 2; Fig. 4, a section on the line 4—4 of Fig. 2; Fig. 5, a section on the line 5—5 of Fig. 1, and Fig. 6, a detail perspective view of one of the dust shields employed in the construction of the wheel.

Referring to the drawings the wheel is shown as comprising a hub 10 from which radiate spokes 11. The wheel further comprises inner and outer rims 12 and 13 respectively and an intermediate rim 14 the outer ends of the spokes 11 being secured to the intermediate rim 14 and passing respectively through elongated slots 15 in the inner rim 12. Extending through the inner and outer rims 12 and 13 and through elongated slots 16 in the intermediate rim 14 are bolts 17, the rims 12 and 14 are free to slide upon the bolt 17 and encircling said bolts between the rims 12 and 14 and between the rims 14 and 13 respectively are springs 18 and 19 which are adapted to respond to undue pressure exerted upon the rim 13 as will be obvious. Encircling each of the spokes 11 between the rims 12 and 14 are springs 20 which also enhance the general resiliency of the wheel structure. Each slot 15 is covered by a dust shield which comprises a plate 20 bearing against the inner side of the rim 12 and provided with a tubular extension 21 which surrounds a respective spoke 11 and passes through a respective slot 15. This tubular extension 21 is threaded as at 22 and has engaged thereon a nut 23. Slidable on the tubular extension 21 between the nut 23 and the adjacent side of the rim 12 is a plate 24 which is adapted to be forced into engagement with the outer side of the rim 12 by the manipulation of the nut 23. By this construction it will be apparent that the slots 15 are efficiently closed to prevent entrance of dust therethrough. Formed on the inner and outer sides of the intermediate rim 14 on each edge thereof are flanges 25 which serve to protect the springs employed in the wheel in case of very heavy jars and also aid in obviating side pressure from the spokes. Formed integral with the rim 12 at each side of the latter are outwardly directed flanges 26 and 27 which embrace the rims 14 and 13 and constitute means for holding a tire mounted upon the rim 13 against lateral movement. Connecting the flanges 25 and 26 are bolts 27 disposed respectively adjacent the bolts 17.

What I claim is:—

A spring wheel comprising a hub, spokes radiating from said hub, an intermediate rim to which the outer ends of said spokes are connected, an inner rim having elongated slots therein through which the spokes respectively pass, tubular members engaged on said spokes and passing through said slots, a flange on each tubular member engaging the outer side of the inner rim and covering the adjacent slot, a plate slidable on each tubular member, a nut threaded on each tubular member for forcing said plate into engagement with the exposed side of the inner rim and also covering the adjacent slot, springs surrounding the spokes between the inner and intermediate rim, an outer rim, bolts engaged with the outer rim and slidably engaged through the intermediate and inner rim, springs surrounding said bolts between the inner and intermediate rims and between the intermediate and outer rims respectively, outwardly directed flanges at each side edge of the inner rim for embracing the intermediate and outer rim, and bolts connecting said flanges at spaced intervals.

In testimony whereof, I affix my signature in the presence of two witnesses.

HARRY WEDEMAN.

Witnesses:
H. F. KREMER,
T. W. TRYON.

Copies of this patent may be obtained for five cents each, by addressing the "Commissioner of Patents, Washington, D. C."